(12) United States Patent
Baum et al.

(10) Patent No.: US 8,442,386 B1
(45) Date of Patent: May 14, 2013

(54) SELECTING VIDEO PORTIONS WHERE ADVERTISEMENTS CAN'T BE INSERTED

(75) Inventors: Geoffrey King Baum, Palo Alto, CA (US); Lalit Balchandani, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1392 days.

(21) Appl. No.: 11/766,293

(22) Filed: Jun. 21, 2007

(51) Int. Cl.
*G11B 27/00* (2006.01)

(52) U.S. Cl.
USPC .......................................................... 386/281

(58) Field of Classification Search ...... 386/281; 725/32
See application file for complete search history.

(56) References Cited

U.S. PATENT DOCUMENTS

| | | | |
|---|---|---|---|
| 6,317,795 B1 * | 11/2001 | Malkin et al. ................. | 709/246 |
| 6,748,397 B2 * | 6/2004 | Choi ..................................... | 1/1 |
| 6,956,574 B1 | 10/2005 | Cailloux et al. | |
| 2002/0033842 A1 * | 3/2002 | Zetts ............................ | 345/719 |
| 2002/0170068 A1 * | 11/2002 | Rafey et al. .................... | 725/112 |
| 2003/0026592 A1 * | 2/2003 | Kawahara et al. ............... | 386/52 |
| 2003/0226142 A1 * | 12/2003 | Rand ............................... | 725/32 |
| 2004/0243637 A1 * | 12/2004 | Friedman .................... | 707/104.1 |
| 2005/0033849 A1 * | 2/2005 | Matz ............................ | 709/228 |
| 2005/0060741 A1 * | 3/2005 | Tsutsui et al. ................. | 725/32 |
| 2006/0026628 A1 * | 2/2006 | Wan et al. ....................... | 725/32 |
| 2008/0013915 A1 * | 1/2008 | Gill et al. ........................ | 386/52 |

* cited by examiner

*Primary Examiner* — Thai Tran
*Assistant Examiner* — Sunghyoun Park
(74) *Attorney, Agent, or Firm* — Kilpatrick Townsend & Stockton LLP

(57) ABSTRACT

Methods and apparatus provide for an insert deflector to provide a user (i.e. video editor) with greater control as to media enhancements applied to a user-created video. Specifically, the insert deflector provides blocking code for a portion of a media presentation created by the user. The blocking code is associated with an edit decision list that defines the media presentation. Via execution of the edit decision list to render the media presentation, the insert deflector applies the blocking code to prevent insertion of at least one media insert at the portion of the media presentation. A media insert can be an advertisement inserted into a user-created video, or an advertisement shown in conjunction with the playback of the video.

17 Claims, 6 Drawing Sheets

400 ⟶

310 PROVIDE BLOCKING CODE FOR AT LEAST ONE PORTION OF A MEDIA PRESENTATION

410 WHERE THE MEDIA PRESENTATION COMPRISES A VIDEO COMPOSITION, PROVIDE THE BLOCKING CODE AS XML-BASED METADATA COMPATIBLE WITH THE EDIT DECISION LIST, THE XML-BASED METADATA DEFINING AT LEAST ONE OF A VIDEO FRAME AND A DURATION OF TIME OF THE VIDEO COMPOSITION THAT CANNOT BE ASSOCIATED WITH THE MEDIA INSERT

420 DEFINE THAT ONE OF THE VIDEO FRAME AND THE DURATION OF TIME OF THE VIDEO COMPOSITION IS BLOCKED FROM INCORPORATING THE MEDIA INSERT, THE MEDIA INSERT COMPRISES AT LEAST ONE OF:

(I) AN ADVERTISEMENT FOR PRESENTATION WITHIN THE VIDEO FRAME, (II) AN ADVERTISEMENT FOR PRESENTATION DURING THE DURATION OF TIME, (III) AN ADVERTISEMENT FOR PRESENTATION IN CONJUNCTION WITH ONE OF THE VIDEO FRAME AND THE DURATION OF TIME, AND (IV) AN ADVERTISEMENT OF A TYPE RELATED TO ONE OF A SERVICE AND PRODUCT.

```
340 VIA EXECUTION OF THE EDIT DECISION LIST TO BUILD THE MEDIA
PRESENTATION, APPLY THE BLOCKING CODE TO PREVENT INSERTION OF AT
LEAST ONE MEDIA INSERT AT THE PORTION OF THE MEDIA PRESENTATION

610 EXECUTE THE BLOCKING CODE TO COMMUNICATE TO THE
    ADVERTISEMENT INSERTION SYSTEM TOCANCEL AT LEAST ONE
    ADVERTISEMENT PROGRAMMED TO BE INSERTED WITHIN ONE OF THE
    VIDEO FRAME, AFTER THE VIDEO FRAME, BEFORE THE VIDEO FRAME AND
    THE DURATION OF TIME OF THE PORTION OF THE MEDIA PRESENTATION

620 EXECUTE THE BLOCKING CODE TO COMMUNICATE TO THE
    ADVERTISEMENT INSERTION SYSTEM TO NOT RENDER AT LEAST ONE
    ADVERTISEMENT FOR INSERTION WITHIN ONE OF THE VIDEO FRAME,
    AFTER THE VIDEO FRAME, BEFORE THE VIDEO FRAME AND THE DURATION
    OF TIME OF THE PORTION OF THE MEDIA PRESENTATION
```

FIG. 6

SELECTING VIDEO PORTIONS WHERE ADVERTISEMENTS CAN'T BE INSERTED

BACKGROUND

Conventional technologies for presenting advertisements to potential customers provide a variety of mediums in which to present those advertisements. For example, advertisements can be displayed electronically on web sites or via search engines. Advertisements can be displayed on web sites, for example, via an advertisement banner. Advertisements can be displayed on search engines via a sponsored advertisement. Advertisers pay for the advertisements) by choosing keywords or keyword phrases, and competing against other advertisers who also want their advertisements to appear on web sites relevant to those keywords or keyword phrases.

When an end user enters a web site containing advertisements, the advertisements (for which the advertisers have bid on keyword or keyword phrases) are displayed. The displaying of the advertisements is referred to as an 'impression'. Advertisers pay by number of impressions, simple navigation to the advertiser site (pay per click) or actions taken on an advertisers site (pay per action).

Conventional computerized devices, such as personal computers, laptop computers, and the like utilize graphical user interfaces in applications such as operating systems and graphical editors (i.e., web page editors, document editors, video editors, etc.) that enable users to quickly provide input and create projects using "What You See Is What You Get" (WYSIWYG) technology. In general, using a graphical user interface, a user operates an input device such as a mouse or keyboard to manipulate digital content on a computer display. The digital content is often represented as icons, and the user can operate an input device such as a mouse to move a mouse pointer onto an icon (i.e., graphically overlapping the icon on the graphical user interface). By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer. Using graphical user interface technology, users can create projects by dragging and dropping digital content (i.e., graphical objects, text, text boxes, images, videos, etc) into the project.

In addition, conventional desktop software applications operate on computer systems to allow for users, known as film or video editors, to edit digital video content. In particular, non-linear editing is a non-destructive editing method that involves being able to access any frame in a video clip with the same ease as any other. Initially, video and audio data from a media source file can be digitized and recorded directly to a storage device that is local to the computer system, like a desktop personal computer. The media source file can then be edited on the computer using any of a wide range of video editing software. Example edits that can be made to the video include splicing video segments together, applying effects to video, adding subtitles, and the like.

SUMMARY

Conventional computer systems suffer from a variety of deficiencies. For example, conventional Internet websites, such as Revver.com and Adbrite.com, provide models for generating advertising revenue from user-created videos. Each user can post their video onto the conventional website which inserts advertisements into the video, thereby presenting advertisements in conjunction with the presentation of the video. However, the original video creator has no control over the advertisements that are inserted and no control over where the advertisements are to be placed in the video.

Techniques discussed herein significantly overcome the deficiencies of conventional applications such as those discussed above as well as additional techniques also known in the prior art. As will be discussed further, certain specific embodiments herein are directed to an insert deflector. The one or more embodiments of the insert deflector as described herein contrast with conventional systems to provide the user with greater control as to enhancements (e.g. advertisements, media effects, media inserts) applied to a user-created video.

For example, in one embodiment on the insert deflector, blocking code can be created and stored as a part of an edit decision list. As the edit decision list is being executed to render a media presentation (such as a video composition), an advertisement insertion engine of an online video service can be blocked by the blocking code from incorporating advertisements into particular portions of the video composition during the video rendering process. In another embodiment, the blocking code can be executed after the video composition is rendered to block (i.e. prevent) advertisements that the advertisement insertion engine seeks to present as the video composition is played back—such as a banner ad or a media effect that is applied to the video composition by the online video service.

Thus, methods and apparatus disclosed herein provide for an insert deflector to provide a user (i.e. video editor, video creator) with greater control as to media enhancements applied to a video created by that user. Specifically, the insert deflector creates blocking code for a portion of a media presentation created by the user. The blocking code is associated with an edit decision list that defines the media presentation. Via execution of the edit decision list to render the media presentation, the insert deflector applies the blocking code to prevent insertion of at least one media insert at the portion of the media presentation. A media insert can be an advertisement inserted into a user-created video, or an advertisement shown in conjunction with the playback of the video.

Thus, in contrast to conventional systems, the insert deflector gives a user (i.e. the video creator) control over advertisements that may be inserted into (or overlayed onto) the user's video from a website that is hosting an online video environment. Thus, the insert deflector can prevent video enhancements, media effects, advertisements and the like from being applied to portions of the user's video that the user has specified are not to include any additional media content. The integrity of the video is thus protected from such conventional online environments that seek to monetize any video content. It is also understood that such advertisements (ads) that are prevented can be translucent overlay ads, text caption ads that float above a video player or ads that interrupt video playback. Further, templates and configuration files can be implemented to prevent advertisement insertion.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone.

The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for an insert deflector to provide the user with greater control of enhancements applied to a user-created video as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 4 is a flowchart of processing steps performed by an insert deflector to create XML-based metadata compatible with an edit decision list according to embodiments herein.

FIG. 6 is a flowchart of processing steps performed by an insert deflector to apply the blocking code to prevent insertion a media insert at a portion of a media presentation according to embodiments herein.

DETAILED DESCRIPTION

Figure 1:
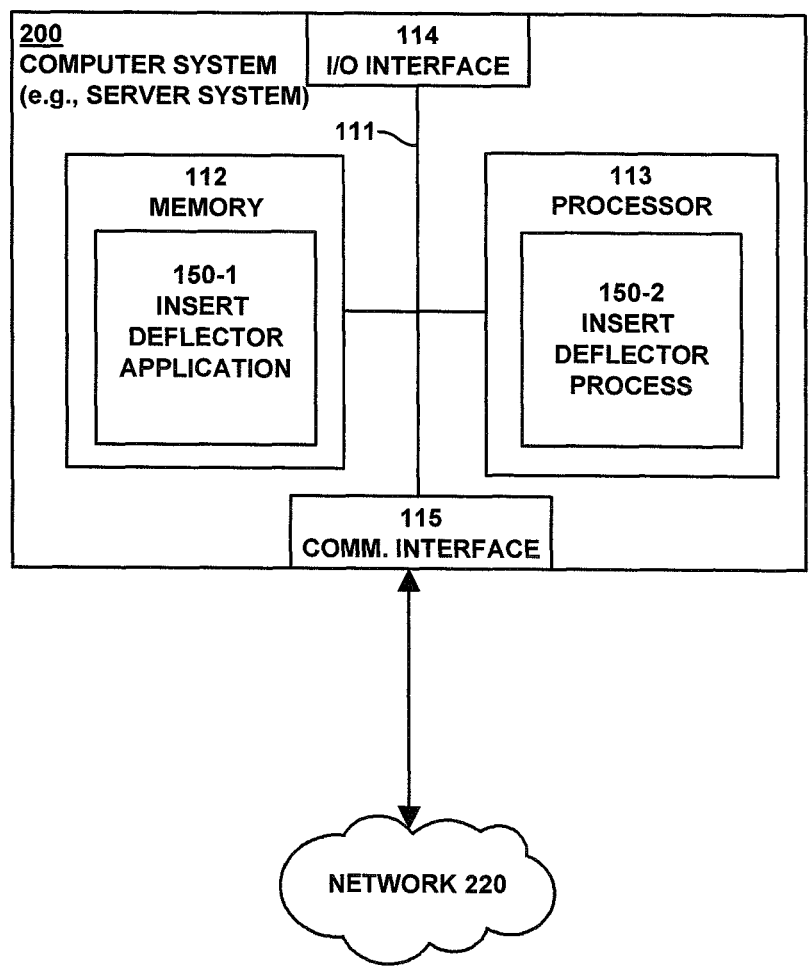
FIG. 1 is block diagram illustrates an example of architecture for an insert deflector according to embodiments herein.

Methods and apparatus provide for an insert deflector to provide a user (i.e. video editor) with greater control as to media enhancements applied to a user-created video. Specifically, the insert deflector creates blocking code for a portion of a media presentation created by the user. The blocking code is associated with an edit decision list that defines the media presentation (i.e. video composition). Via execution of the edit decision list to render the media presentation, the insert deflector applies the blocking code to prevent insertion of at least one media insert at the portion of the media presentation.

A media insert can be an advertisement inserted into a user-created video composition, or an advertisement shown in conjunction with the playback of the video composition.

In one embodiment of the insertion manager, a user can use Adobe Premiere Express® to specify portions of a video composition that are not to include advertisements (or a media insert, media enhancement and the like). As the user creates the video, the user can select a portion of the video composition (or the entire video composition) that is "blocked" from including advertisements or any other media enhancement not originating from the user's video editing session.

In another embodiment of the insertion manager, a first user can access a server system which hosts an online video service allowing users to create and edit videos. As the first user is creating a video composition, the insertion manager creates an edit decision list. Additionally, the first user can specify a portion(s) in the video composition that cannot incorporate any media inserts (i.e. advertisements) or third-party enhancements. As the first user specifies the "protected" portions of the video composition, the insert deflector provides blocking code reflecting the first user's decisions. Specifically, the insert deflector places blocking code in the edit decision list of the video composition. The edit decision list (which includes the blocking code) can further be stored at the server.

When a second user logs onto the online video service and requests to view the first user's video composition, the insert deflector accesses the edit decision list created during the first user's video editing session. The insert deflector executes the edit decision list to render the video composition with one or more base media files. As the edit decision list is executed, the blocking code can be executed as well. Thus, if an advertisement insertion engine is part of the online video service, the blocking code provides instructions to the insert deflector to block the advertisement insertion engine from inserting advertisements at the "protected" video portions, as specified by the first user. Thus, the advertisement insertion engine can be blocked by the executed blocking code during the video render process. In the alternative, the blocking code can be executed after the video composition is rendered to block (i.e. cancel) advertisements that the advertisement insertion engine seeks to present as the video composition is played back—but not as part of the video composition itself.

For example, the advertisement insertion engine can be programmed to present an advertisement while the video composition is being played. Here, the blocking code can prevent the presentation of the banner the advertisement after the video composition is rendered. In another example, the advertisement insertion engine can be programmed to include an advertisement into one or more actual frames of the video composition itself (or between two video frames). In other words, the advertisement can be a corporate logo to be included in and rendered with the base media of the video composition. To block such instances of advertisement insertion into the video at the rendering stage, the blocking code can be executed as the edit decision list is executed to render the particular portions of the video composition "protected" by the blocking code.

Similarly, when third parties upload base media that can be used for user-created videos, the base media can include blocking code as well to ensure that no advertisements are applied to the base media. Thus, the insert deflector creates base media which is suitable for inclusion in the media presentation. Blocking code for the base media is created in order to prevent the application of a media insert to the base media. The insert deflector then associates the blocking code for the base media to the base media as XML-based metadata appended to the base media. It is also understood that the insert deflector can be embodied in a desktop system that creates a metadata text file that identifies the blocked regions while allowing a user to create a video composition and a metadata text file that identifies the blocked regions.

The following discussion relates to providing the edit decision list (E.D.L.) that will be stored at a server associated with the proxy media editor. The edit decision list can be an XML-based text file that contains instructions and information for the server associated with the proxy media editor as to video edits, video sequencing, file layering and audio data that can be applied to base media (i.e. the original video) to ultimately present an edited version of the original video to the user. The server system never needs to persistently store the edited version, but only needs to have the original unedited media (including video, images, audio, and the like) and the edit decision list that indicates what edits are to be made to the original video to reproduce the edited version during real time application of the edit decision list to the original media. Once the base media and the edit decision list are fully rendered into the edited video with a particular output specification, the edited video for that output specification can be stored. In one embodiment, the proxy media editor can create a new video file (such as a Flash video file) via combining the E.D.L. and the base media according to the output specification of a particular delivery channel. In another embodiment, "on the fly" rendering can be implemented such that no actual edited video file is created. In other words, the proxy media editor applies the output specification that corresponds to the delivery channel of the user who is currently requesting video playback—as the E.D.L. and base media are combined.

The edit decision list is a text file that can include hyperlink or include many hyperlinks to resources (e.g. such as video clips, editing effects, and the like) that reside on a network such as the Internet. In addition to the edit decision list, the user can also receive a media effect that can include effects, graphics and transitions that can be applied to the base media.

The base media can be an aggregate of individual video, audio, and graphics files stitched together into a continuous video as defined by the edits encoded into the edit decision list. Such files can each reside at universal resource locators (U.R.L). within an asset management system (e.g., digital library) related to the server or even throughout many different computer systems on the Internet. Hence, the edit decision list can instruct the server to locate and to collect video, audio, and graphics files and to further sequence and layer the files accordingly.

As the base media, such as a stitched continuous video, gets aggregated, it is received and processed at a rendering engine local to the server in order to present the video in an edited version. Both the edit decision list and media effects are executed upon the base media. The base media is thus the original video and the server obtains the edit decision list and "executes" the edit instructions of the E.D.L contained therein upon the base media.

Turning now to FIG. 1, a block diagram illustrates an example of architecture for a computer system 200 that executes, runs, interprets, operates or otherwise performs a insert deflector application 150-1 and/or insert deflector process 150-2 (e.g. an executing version of the application 150-1 which can be controlled by a user) according to embodiments herein. The computer system 200 may be any type of computerized device such as a personal computer, workstation, portable computing device, console, laptop, network terminal or the like. In particular, the computerized device 200 can be a web server hosting an online video service that inserts media (e.g. advertisements) into user-created videos.

As shown in the present example, the computer system 200 includes an interconnection mechanism 111 such as a data bus, motherboard or other circuitry that couples a memory system 112, a processor 113, and an input/output interface 114. An input device (e.g., one or more user/developer controlled devices such as a keyboard, mouse, touch pad, etc.) can couple to the computer system 200 and processor 113 through an input/output (I/O) interface 114.

The memory system 112 can be any type of computer readable medium and, in this example, is encoded with a insert deflector application 150-1 that supports generation, display, and implementation of functional operations as will be further explained herein.

During operation of the computer system 200, the processor 113 accesses the memory system 112 via the interconnect 111 in order to launch, run, execute, interpret or otherwise perform the logic instructions of the insert deflector application 150-1. Execution of the insert deflector application 150-1 in this manner produces a insert deflector process 150-2. In other words, the insert deflector process 150-2 represents one or more portions or runtime instances of the insert deflector application 150-1 (or the entire application 150-1) performing or executing within or upon the processor 113 in the computerized device 200 at runtime.

Further details of configurations explained herein will now be provided with respect to flow charts of processing steps that show the high level operations disclosed herein to perform the insert deflector process 150-2, as well as graphical representations that illustrate implementations of the various configurations of the insert deflector process 150-2.

Figure 2:
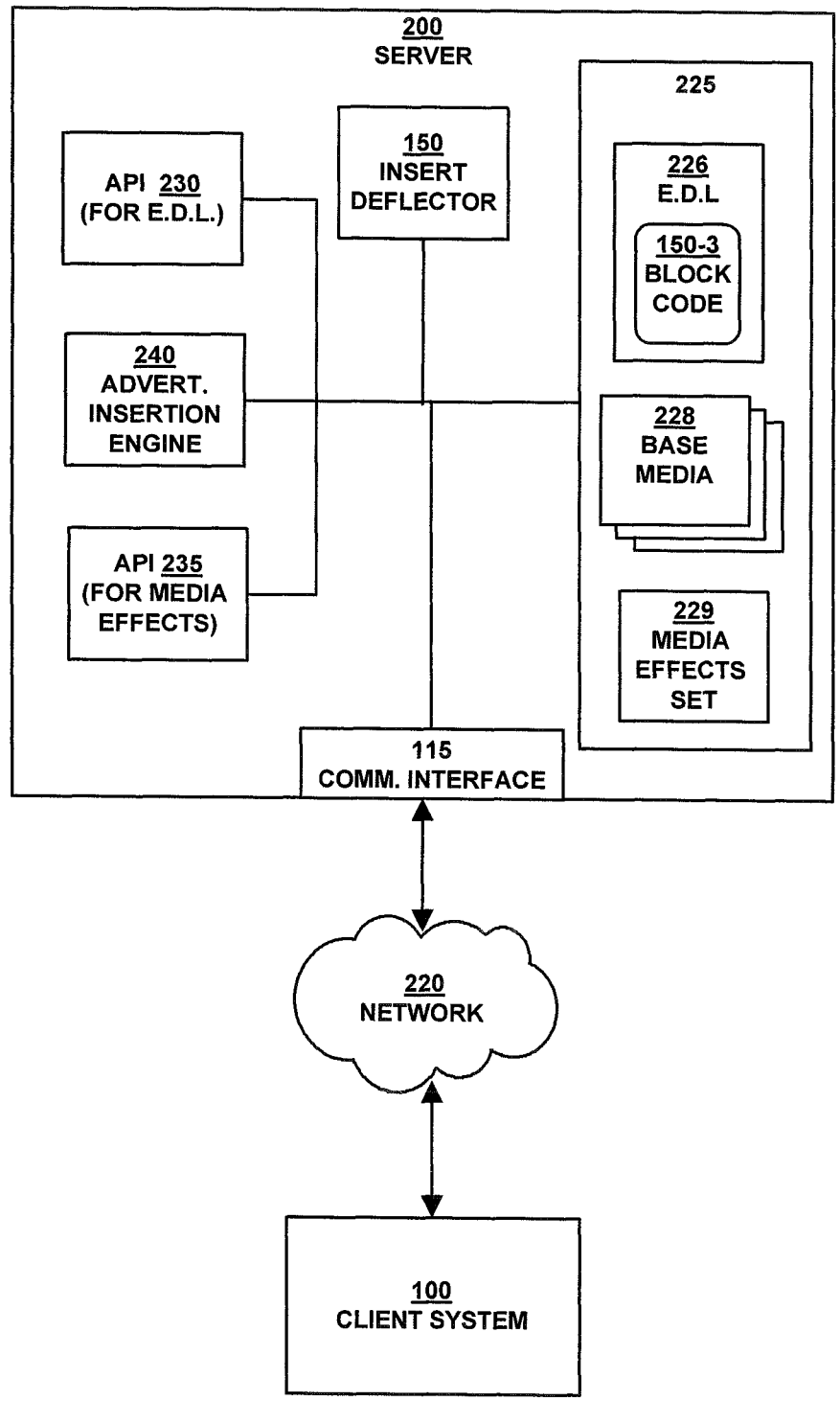
FIG. 2 is a block diagram of the computer system configured with a insert deflector according to embodiments herein.

FIG. 2 is a block diagram of the computer system configured with an insert deflector 150 according to embodiments herein. The computer system of FIG. 2 is a server system 200 which includes the insert deflector 150. In the alternative, the server system 200 can be associated with the insert deflector 150, and/or the insert deflector 150 itself can include the server system 200. The server system 200 can also include an asset management system 225 to store an edit decision list (E.D.L.) 226, base media 228, and a media effects set 229 (where a media effects set can include one or more media effects). The edit decision list (E.D.L.) 226 includes blocking code 150-3 (e.g. XML based metadata) which is operative to prevent media inserts from being incorporated into portions of a media presentation. The server system 200 further includes an application programming interfaces 230, 235 for the edit decision list 226 and the media effects set 229, respectively. An advertising insertion system 240 is provided in the server system 200 to insert media and advertisements into user-created video compositions. The server system 200 interacts with a network 220 via a communications interface 115 to receive requests from a client system 100.

It is understood that a media effects set 229 can include one or more video effects, graphics and transitions that can be applied to the base media. As an example, the user can add an opening title screen with a transition to the initial frame of the edited video. Also, the user can add subtitles throughout the frames of the edited video wherever dialogue occurs. Other media effects can involve converting various potions of a video to 'black-and-white,' and some media effects can provide audio effects and/or embellishments.

An asset management system 225 is also included in the server system 200 as well which can be utilized for managing content for the web. The asset management system can manage content (text, graphics, links, etc.) for distribution on a web server (e.g a Flash Media Server). Thus, the asset management system 225 can also include software where users can create, edit, store, retrieve, and manage content with relative ease of use. Such an asset management system 225 can use a database, for example, to catalog and store content, and a presentation layer displays the content to regular website visitors based on a set of templates.

A user can send a request from the client system 100 to the server system 200 via the network 220 to view a media presentation (i.e. a user-created video composition). For example, the client system 100 can launch a web browser at the client system 100 that communicates with the server 200 and, thereby, the insert deflector 150.

In response to receiving the user's request for a particular video composition, the insert deflector 150 can search for and access the corresponding edit decision list (E.D.L.) 226 stored in the asset management system 225 that must be executed in order to render the video composition. The insert deflector 150 can utilize a rendering engine to execute the edit decision list (E.D.L.) 226 and media effects 229 to base media 228. The rendering engine further executes the E.D.L. 226 in accordance with the blocking code 150-3 in the E.D.L. 226. The blocking code 150-3 can include instructions to cancel and block the insertion of advertisements into the video composition from the advertisement insertion engine 240.

Figure 3:
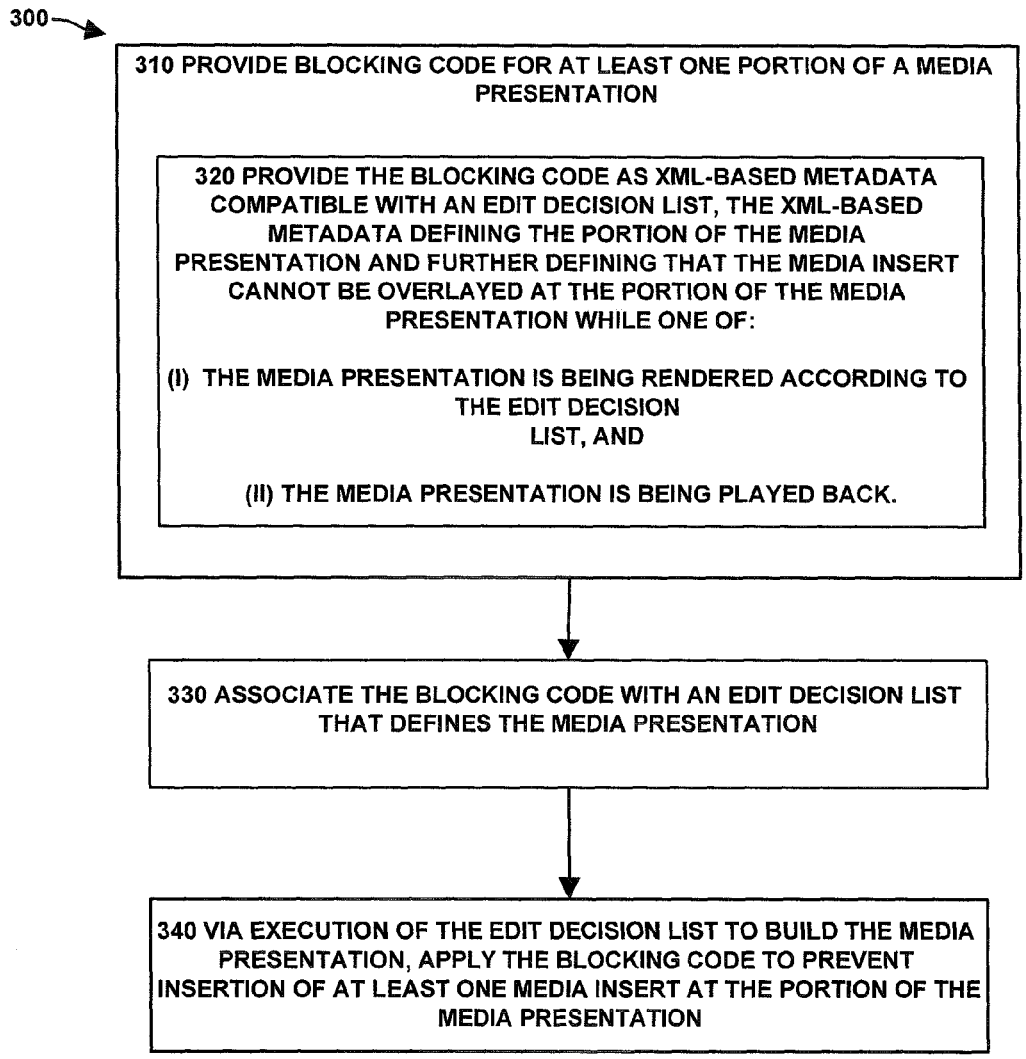
FIG. 3 is a flowchart of processing steps performed by an insert deflector to create blocking code for a portion of a media presentation to according to embodiments herein.

FIG. 3 is a flowchart 300 of processing steps 310-340 performed by an insert deflector 150 to create blocking code for a portion of a media presentation to according to embodiments herein. The steps in flowchart 300 refer to the features illustrated in the block diagrams of FIGS. 1 and 2.

At step 310, the insert deflector 150 provides blocking code 150-3 for a portion of a media presentation. At step 320, the blocking code 150-3 (as XML-based metadata) is compatible with the edit decision list 226 and defines a portion of the media presentation and further defines that a media insert (such as an advertisements) cannot be applied at the portion of the media presentation while: (i) the media presentation is being rendered according to the edit decision list 226 or (ii) the media presentation is being played back.

At step 330, the insert deflector 150 associates the blocking code 150-3 with an edit decision list 226 that defines the media presentation. Via execution of the edit decision list to render the media presentation, at step 340, the insert deflector 150 applies the blocking code 150-3 to prevent insertion of at least one media insert at the portion of the media presentation.

In one embodiment of an insert deflector 150, a user can utilize a user-interface of a video service to mark portions of a video that are not to include media inserts and enhancements that are not already provided for in the video's corresponding edit decision list 226. As the user marks the "protected" portions of the video, blocking code 150-3 operative to prevent such media inserts from being applied to the marked portions is created as XML-metadata and appended to the edit decision list 226. Thus, if the video service implements an advertisement insertion engine 240 that can incorporate advertisements into video, the blocking code 150-3 is executed to ensure that any incorporated advertisements are not applied at the "protected" portions. For example, if the blocking code 150-3 defines the "protected" portion as the entire video, then the advertisement insertion engine 240 can only place an advertisement before or after the video.

FIG. 4 is a flowchart 400 of processing steps 410-420 performed by an insert deflector to create XML-based metadata compatible with an edit decision list according to embodiments herein. The steps in flowchart 400 refer to the features illustrated in the block diagrams of FIGS. 1 and 2.

At step 410, where the media presentation comprises a video composition, the insert deflector 150 provides the blocking code 150-3 as XML-based metadata that is compatible with the edit decision list 226, such that the blocking code 150-3 can be included as part of the edit decision list 226. The XML-based metadata defines a video frame or a duration of time of the video composition that cannot be associated with the media insert.

At step 420, the insert deflector 150 defines a video frame or a duration of time in the video composition that is blocked from incorporating a media insert. In particular, the media insert can be (i) an advertisement for presentation within a video frame, (ii) an advertisement for presentation during the duration of time, (iii) an advertisement for presentation in conjunction with one of the video frame and the duration of time, and (iv) an advertisement related to a particular service or product.

In another embodiment of an insert deflector 150, a rendering engine associated with the insert deflector 150 executes the edit decision list 226 to render a video. The blocking code 150-3 is part of the edit decision list 226 and is executed at the rendering engine as well. The blocking code 150-3 can communicate with an advertisement insertion engine 240 to identify the types of advertisements which cannot be inserted into the rendered video. For instance, if the video pertains to a user's video clips from a family gathering, the user can specify that portions of the video are not to be associated with advertisements for alcohol and cigarettes. Thus, as the user marks such portions, blocking code 150-3 is created which specifies that advertisements for alcohol and cigarettes cannot be included in those portions of the video as it is being rendered. However, since the blocking code 150-3 relates only to alcohol and cigarettes advertisements, the advertisement insertion engine 240 can incorporate other kinds of advertisements in the "protected" portions.

Figure 5:
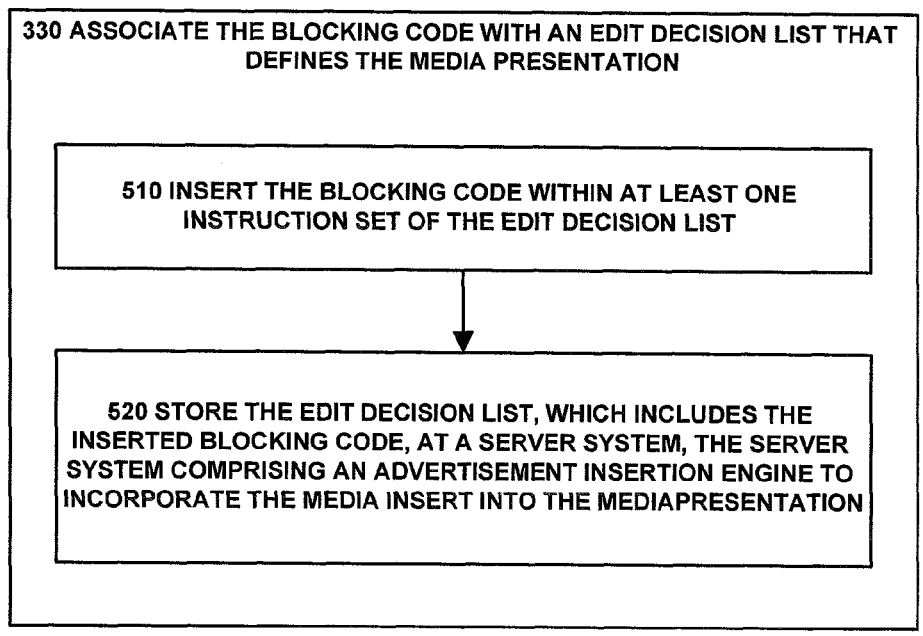
FIG. 5 is a flowchart of processing steps performed by an insert deflector to insert blocking code into an edit decision list according to embodiments herein.

FIG. 5 is a flowchart 500 of processing steps 510-520 performed by an insert deflector to insert blocking code into an edit decision list according to embodiments herein. The steps in flowchart 500 refer to the features illustrated in the block diagrams of FIGS. 1 and 2.

At step 510, the insert deflector 150 inserts the blocking code 150-3 within an instruction set of the edit decision list 226. The blocking code 150-3 can be XML-based metadata that is incorporated into or appended to the edit decision list 226. Thus, as the edit decision list 226 is executed, then the blocking code 150-3 is processed as well.

At step 520, the insert deflector 150 stores the edit decision list 226, which includes the inserted blocking code 150-3, at a server system 200 (e.g Flash Media Server) which provides an advertisement insertion engine 240 that can incorporate an media insert into a media presentation.

FIG. 6 is a flowchart 600 of processing steps 610-620 performed by an insert deflector to apply the blocking code to prevent insertion a media insert at a portion of a media presentation according to embodiments herein. The steps in flowchart 600 refer to the features illustrated in the block diagrams of FIGS. 1 and 2. For FIG. 6 specifically, the order of the steps for flowchart 600 are arbitrary.

At step 610, the insert deflector 150 executes the blocking code 150-3 to communicate to an advertisement insertion engine 240 to cancel advertisements programmed to be inserted within a video frame, after a video frame, before a video frame or during a particular duration of time of the media presentation.

In one embodiment, the advertisement insertion engine 240 can program a video advertisement to be presented before, after or during the video clip or an overlay ad that runs on top of the video at certain points, such as during the final 20 seconds of a user-created video. However, the blocking code 150-3 in the edit decision list 226 used to render the user-created video can define the that final 20 seconds must not be associated with any advertising. Although providing the banner advertisement is involved in the video rendering process, the blocking code 150-3 can provide the advertisement insertion engine 240 with instructions to cancel the banner advertisement during playback of the rendered video. In yet another embodiment, a file of the rendered video can be saved with the blocking code 150-3 as well. Thus, the video need not be "re-rendered" in order to avoid banner advertisements.

At step 620, the insert deflector 150 executes the blocking code 150-3 to communicate to the advertisement insertion engine 240 to not render an advertisement for insertion within a video frame, after a video frame, before a video frame or during a particular duration of time of the media presentation. For example, in one embodiment of the insert deflector 150, the advertisement insertion engine 240 can be programmed to "burn" a corporate logo (known as a bug) into a corner of various frames of a user-created video. Thus, as the edit decision list 226 is executed to render the video, the advertisement insertion engine 240 adds media data representing the corporate logo into the base media that the edit decision list 226 is using to "build" the video. The blocking code 150-3 in the edit decision list 226 can be executed via the rendering engine to prevent the advertisement insertion engine 240 from adding such corporate logo media data. In other words, if the advertisement insertion engine 240 is programmed to burn the corporate logo into a video frame that is to be "protected" from any media inserts, the blocking code 150-3 will cancel the advertisement insertion engine 240 from burning the corporate logo into that "protected" video frame.

Other embodiments of an insert deflector 150 is disclosed herein also include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Note again that techniques herein are well suited for to allow for an insert deflector 150 to provide a user (i.e. video editor, video creator) with greater control as to media enhancements (such as advertisements) applied to a user-created video. However, it should be noted that embodiments herein are not limited to use in such applications and that the techniques discussed herein are well suited for other applications as well. While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   providing, by a processor, blocking code associated with at least one portion of a media presentation;
   associating, by the processor, the blocking code with an edit decision list, wherein the edit decision list comprises at least one instruction for modifying at least one base media to generate the media presentation; and
   executing, by the processor, the blocking code via execution of the edit decision list to prevent inserting at least one media insert at the at least one portion of the media presentation, wherein executing the blocking code comprises communicating an instruction to an advertisement engine executed at an additional device to cancel the at least one media insert programmed for insertion in the media presentation from being inserted into the media presentation.

2. The method as in claim 1, wherein providing the blocking code associated with the at least one portion of the media presentation, includes:
   identifying, based on input to a user-interface, the at least one portion of the media presentation;
   providing the blocking code as metadata compatible with the edit decision list, the metadata defining the at least one portion of the media presentation and further defining that the at least one media insert cannot be applied at the at least one portion of the media presentation while one of:
      the media presentation is being rendered according to the edit decision list, and
      the media presentation is being played back.

3. The method as in claim 1, wherein providing the blocking code associated with the at least one portion of the media presentation, includes:
   where the media presentation comprises a video composition, providing the blocking code as metadata compatible with the edit decision list, the metadata defining at least one of a video frame and a duration of time of the video composition that cannot be associated with the at least one media insert.

4. The method as in claim 3, wherein the metadata defining at least one of the video frame and the duration of time of the video composition that cannot be associated with the at least one media insert, includes:
   defining that one of the video frame and the duration of time of the video composition is blocked from incorporating the at least one media insert, the at least one media insert comprising at least one of:
      i. an advertisement for presentation within the video frame;
      ii. an advertisement for presentation during the duration of time; and
      iii. an advertisement for presentation in conjunction with one of the video frame and the duration of time.

5. The method as in claim 1, further comprising:
   providing, by the processor, the at least one base media, the at least one base media suitable for inclusion in the media presentation;
   providing, by the processor, blocking code for the at least one base media, the blocking code for the at least one base media comprising metadata for preventing application of the at least one media insert to the at least one base media; and
   associating at least one the blocking code for the at least one base media with the at least one base media, wherein the associating the blocking code for the at least one base media comprises appending the blocking code to the at least one base media.

6. The method as in claim 1, wherein executing the blocking code associated with the edit decision list to prevent inserting at least one media insert at the at least one portion of the media presentation includes:
   executing the blocking code to communicate to the advertisement engine to cancel the at least one media insert programmed to be inserted within one of a video frame, after the video frame, before the video frame and a duration of time of the at least one portion of the media presentation.

7. The method as in claim 1, wherein associating the blocking code with the edit decision list comprises inserting the blocking code into the edit decision list or appended to the edit decision list.

8. The method of claim 1, wherein executing the blocking code further comprises:
identifying a first content from at least one first type of the at least one media insert;
determining that the first content cannot be inserted into the media presentation;
identifying a second content from at least one second type of at least one additional media insert; and
allowing the at least one additional media insert to be inserted into the media presentation.

9. The method of claim 1, wherein executing the blocking code further comprises communicating an additional instruction to the advertisement engine allowing the at least one media insert to be inserted before or after the media presentation.

10. The method of claim 1, wherein the instruction specifies that the at least one media insert is not to be overlayed over the media presentation during rendering of the presentation.

11. A non-transitory computer readable medium comprising executable instructions encoded thereon operable on a computerized device to perform processing comprising:
instructions for providing blocking code for at least one portion of a media presentation;
instructions for associating the blocking code with an edit decision list, wherein the edit decision list comprises at least one instruction for modifying at least one base media to generate the media presentation at a first computing device; and
instructions for executing the blocking code via execution of the edit decision list to prevent inserting at least one media insert at the at least one portion of the media presentation, wherein executing the blocking code comprises communicating an instruction to an advertisement engine executed at a second device to cancel the at least one media insert programmed for insertion in the media presentation from being inserted into the media presentation.

12. The computer readable medium as in claim 11, wherein the instructions for providing the blocking code associated with the at least one portion of the media presentation include:
instructions for identifying, based on input to a user-interface, the at least one portion of the media presentation;
instructions for providing the blocking code as metadata compatible with the edit decision list, the metadata defining the at least one portion of the media presentation and further defining that the at least one media insert cannot be applied at the at least one portion of the media presentation while one of:
the media presentation is being rendered according to the edit decision list, and
the media presentation is being played back.

13. The computer readable medium as in claim 11, wherein the instructions for providing the blocking code associated with the at least one portion of the media presentation includes:
where the media presentation comprises a video composition, instructions for providing the blocking code as metadata compatible with the edit decision list, the metadata defining at least one of a video frame and a duration of time of the video composition that cannot be associated with the at least one media insert.

14. The computer readable medium as in claim 13, wherein the instructions for the metadata defining at least one of the video frame and the duration of time of the video composition that cannot be associated with the at least one media insert include:
instructions for defining that one of the video frame and the duration of time of the video composition is blocked from incorporating the at least one media insert, the at least one media insert comprising at least one of:
i. an advertisement for presentation within the video frame;
ii. an advertisement for presentation during the duration of time; and
iii. an advertisement for presentation in conjunction with one of the video frame and the duration of time.

15. The computer readable medium as in claim 11, further comprising:
instructions for providing the at least one base media, the at least one base media suitable for inclusion in the media presentation;
instructions for providing blocking code for the at least one base media, the blocking code for the at least one base media is metadata for preventing application of the at least one media insert to the at least one base media; and
instructions for associating the blocking code for the at least one base media to the at least one base media, wherein the associating the blocking code for the at least one base media comprises instructions for appending the blocking code to the at least one base media.

16. The computer readable medium as in claim 11, wherein the instructions for executing the blocking code associated with the edit decision list to prevent inserting at least one media insert at the at least one portion of the media presentation include:
instructions for executing the blocking code to communicate to the advertisement engine to cancel the at least one media insert programmed to be inserted within one of a video frame, after the video frame, before the video frame and the duration of time of the at least one portion of the media presentation.

17. A computer system comprising:
a processor;
a memory unit that stores instructions associated with an application executed by the processor; and
an interconnect coupling the processor and the memory unit, enabling the computer system to execute the application and perform operations of:
providing blocking code associated with at least one portion of a media presentation;
associating the blocking code with an edit decision list, wherein the edit decision list comprises at least one instruction for modifying at least one base media to generate the media presentation at the computing system; and
executing the blocking code via execution of the edit decision list to prevent inserting at least one media insert at the at least one portion of the media presentation, wherein executing the blocking code comprises communicating an instruction to an advertisement engine executed at an additional device to cancel the at least one media insert programmed for insertion in the media presentation from being inserted into the media presentation.

* * * * *